(12) United States Patent
Tsai et al.

(10) Patent No.: US 11,809,071 B2
(45) Date of Patent: Nov. 7, 2023

(54) WAVELENGTH CONVERSION MODULE AND PROJECTOR

(71) Applicant: Coretronic Corporation, Hsin-Chu (TW)

(72) Inventors: Chia-Lun Tsai, Hsin-Chu (TW); Shi-Wen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/743,478

(22) Filed: May 13, 2022

(65) Prior Publication Data

US 2022/0365411 A1 Nov. 17, 2022

(30) Foreign Application Priority Data

May 13, 2021 (CN) .......................... 202121021582.3

(51) Int. Cl.
  *G03B 21/20* (2006.01)
  *G02B 26/00* (2006.01)
  *G03B 21/16* (2006.01)

(52) U.S. Cl.
  CPC ......... *G03B 21/204* (2013.01); *G02B 26/008* (2013.01); *G03B 21/16* (2013.01)

(58) Field of Classification Search
  CPC .. G03B 21/204; G03B 21/16; G03B 21/2033; G02B 26/008
  See application file for complete search history.

(56) References Cited

U.S. PATENT DOCUMENTS

| | | | |
|---|---|---|---|
| 10,495,957 B2 | 12/2019 | Tsai et al. | |
| 2019/0011817 A1* | 1/2019 | Kobayashi | .............. F21V 29/76 |
| 2020/0225462 A1* | 7/2020 | Hsu | ...................... H04N 9/3158 |
| 2022/0163876 A1* | 5/2022 | Hsu | ...................... G03B 21/204 |
| 2022/0206372 A1* | 6/2022 | Tsai | ...................... G03B 21/208 |
| 2022/0269155 A1* | 8/2022 | Fu | ........................... B32B 9/005 |

FOREIGN PATENT DOCUMENTS

| | | | | |
|---|---|---|---|---|
| CN | 106796387 | | 6/2020 | |
| JP | 2018004668 A | * | 1/2018 | ............. G03B 21/16 |
| TW | I651580 | | 2/2019 | |

* cited by examiner

*Primary Examiner* — Magda Cruz
(74) *Attorney, Agent, or Firm* — JCIPRNET

(57) ABSTRACT

A wavelength conversion module includes a wavelength conversion wheel, a driving assembly, thermal conductive adhesive structures, and a deflector. The wavelength conversion wheel includes a rotatable disc and a wavelength conversion layer. The driving assembly is connected to the rotatable disc, and the wavelength conversion layer and the thermal conductive adhesive structures are respectively located on two opposite sides of the rotatable disc. The deflector is connected to the wavelength conversion wheel along the axis through the thermal conductive adhesive structures. Heat dissipation channels are formed among the deflector, the rotatable disc and the thermal conductive adhesive structures. An air inlet is defined by each of the heat dissipation channels and the deflector near the axis, and an air outlet is defined between each of the heat dissipation channels and a periphery of the deflector. An area of the air inlet is larger than an area of the air outlet.

20 Claims, 16 Drawing Sheets

WAVELENGTH CONVERSION MODULE AND PROJECTOR

CROSS-REFERENCE TO RELATED APPLICATION

This application claims the priority benefit of China application serial no. 202121021582.3, filed on May 13, 2021. The entirety of the above-mentioned patent application is hereby incorporated by reference herein and made a part of this specification.

BACKGROUND

Technical Field

The invention relates to an optical module and a projector, and particularly relates to a wavelength conversion module and a projector using the wavelength conversion module.

Description of Related Art

In a device of a solid-state light source laser (SSI Laser) projector, a phosphor wheel is located on a transmission path of an excitation light beam of a light source module, and a blue laser light beam emitted by a blue laser light source is projected to a light conversion region of the phosphor wheel to excite a yellow converted light beam to achieve a purpose of synthesizing white light. At present, regardless of whether the phosphor wheel is formed by using a metal substrate to stamp a boss or using an adhesive to coat as a heat dissipation boss, a main purpose is to increase turbulence and convection in the space, thereby reducing a temperature of the phosphor wheel. However, the above method cannot effectively control an airflow path, and die sinking is required every time the form of the boss is changed, and the stamping boss has poor variability, which increases timeliness, commonality and cost. In addition, if a ceramic substrate with high thermal conductivity is used as a heat dissipation substrate, since the ceramic substrate is made of a brittle material, it is susceptible to hidden cracks during a substrate molding and processing process. Furthermore, if the heat dissipation boss is coated on a surface of the ceramic substrate, a weight loading of a rotor is increased, which is easier to cause cracks during operation, and accordingly affects reliability of the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a wavelength conversion module, which has better heat dissipation efficiency.

The invention is directed to a projector including the aforementioned wavelength conversion module, which has better projection quality and product competitiveness.

In order to achieve one or a portion of or all of the objects or other objects, an embodiment of the invention provides a wavelength conversion module including a wavelength conversion wheel, a driving assembly, a plurality of thermal conductive adhesive structures, and a deflector. The wavelength conversion wheel includes a rotatable disc and a wavelength conversion layer. The driving assembly is connected to the rotatable disc of the wavelength conversion wheel to drive the wavelength conversion wheel to rotate along an axis of the driving assembly serving as a central axis. The wavelength conversion layer and the thermal conductive adhesive structures are respectively located on two opposite sides of the rotatable disc, and the thermal conductive adhesive structures are arranged at intervals. The deflector is connected to the wavelength conversion wheel along the axis through the thermal conductive adhesive structures. A plurality of heat dissipation channels are formed among the deflector, the rotatable disc and the thermal conductive adhesive structures, and an air inlet is defined by each of the heat dissipation channels and the deflector near the axis, and an air outlet is defined between each of the heat dissipation channels and a periphery of the deflector. When the wavelength conversion wheel rotates, an airflow enters each of the heat dissipation channels from the air inlet and is discharged from the air outlet, wherein an area of the air inlet is larger than an area of the air outlet.

In order to achieve one or a portion of or all of the objects or other objects, an embodiment of the invention provides a projector including an illumination module, a light valve and a projection lens. The illumination module is configured to provide an illumination light beam, and the illumination module includes a light source device and a wavelength conversion module. The light source device is configured to provide an excitation light beam. The wavelength conversion module is disposed on a transmission path of the excitation light beam to receive the excitation light beam. The wavelength conversion module includes a wavelength conversion wheel, a driving assembly, a plurality of thermal conductive adhesive structures, and a deflector. The wavelength conversion wheel includes a rotatable disc and a wavelength conversion layer, wherein the wavelength conversion layer is configured to receive the excitation light beam and convert the excitation light beam into a converted light beam, wherein the illumination light beam includes at least one of the excitation light beam and the converted light beam. The driving assembly is connected to the rotatable disc of the wavelength conversion wheel to drive the wavelength conversion wheel to rotate along an axis of the driving assembly. The wavelength conversion layer and the thermal conductive adhesive structures are respectively located on two opposite sides of the rotatable disc, and the thermal conductive adhesive structures are arranged at intervals. The deflector is connected to the wavelength conversion wheel along the axis through the thermal conductive adhesive structures. A plurality of heat dissipation channels are formed among the deflector, the rotatable disc and the thermal conductive adhesive structures, and an air inlet is defined by each of the heat dissipation channels and the deflector near the axis, and an air outlet is defined between each of the heat dissipation channels and a periphery of the deflector. When the wavelength conversion wheel rotates, an airflow enters each of the heat dissipation channels from the air inlet and is discharged from the air outlet, wherein an area of the air inlet is larger than an area of the air outlet. The light valve is arranged on a transmission path of the illumination light beam to convert the illumination light beam into an image light beam. The projection lens is arranged on a transmission path of the image light beam to project the image light beam out of the projector.

Based on the above description, the embodiments of the invention have at least one of following advantages or effects. In the wavelength conversion module of the invention, the deflector is connected to the wavelength conversion wheel along the axis through the thermal conductive adhesive structures, where a plurality of heat dissipation channels are formed among the deflector, the rotatable disc and the thermal conductive adhesive structures. When the wavelength conversion wheel rotates, the airflow enters the heat dissipation channel from the air inlet with a larger area, and is discharged from the air outlet with a smaller area. During the guiding process, by sandwiching the thermal conductive adhesive structures between the detector and the rotatable disc, the airflow passing through the wavelength conversion wheel may take away heat energy, and a flow velocity of the airflow may be faster, thereby increasing the heat dissipation efficiency of the wavelength conversion module. In addition, the projector adopting the wavelength conversion module of the invention may have better projection quality, thereby enhancing product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
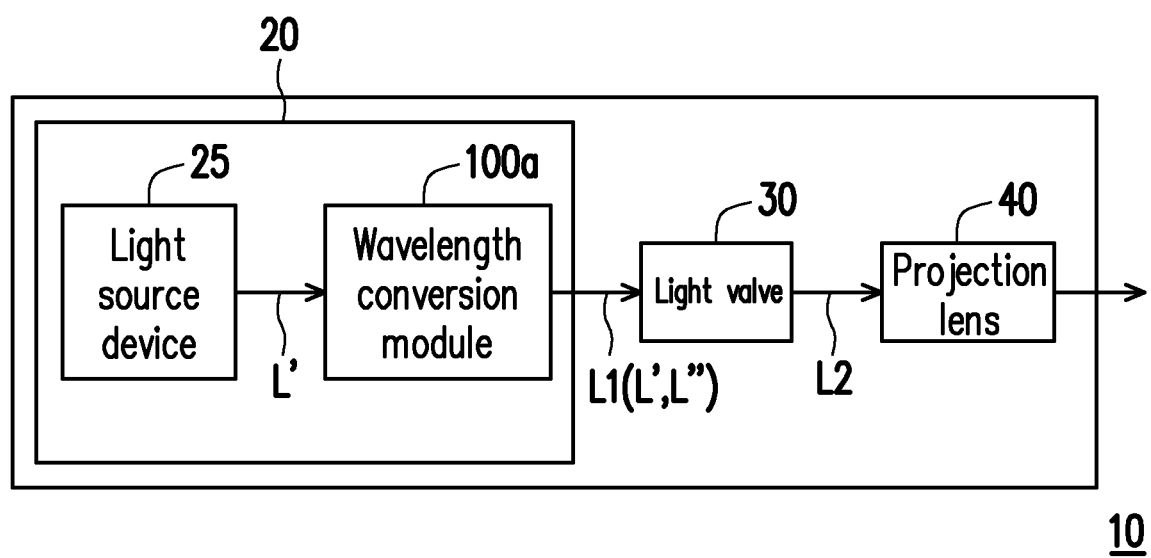
FIG. 1 is a schematic diagram of a projector according to an embodiment of the invention.

FIG. 1 is a schematic diagram of a projector according to an embodiment of the invention. Referring to FIG. 1 first, the projector 10 includes an illumination module 20, a light valve 30 and a projection lens 40. The illumination module 20 is configured to provide an illumination light beam L1, and the illumination module 20 includes a light source device 25 and a wavelength conversion module 100a. The light source device 25 is configured to provide an excitation light beam L', and the wavelength conversion module 100a is disposed on a transmission path of the excitation light beam L' and receives the excitation light beam L'. At one timing, the wavelength conversion module 100a allows the excitation light beam L' to directly penetrate through or reflect the excitation light beam L'; at other timings, the wavelength conversion module 100a is configured to convert a wavelength of the excitation light beam L' to generate converted light beams L" of different wavelengths. The illumination light beam L1 includes at least one of the excitation light beam L' and the converted light beams L" emitted by the wavelength conversion module 100a. In the embodiment, the excitation light beam L' is, for example, a blue light beam, and the converted light beams L" are, for example, a yellow light beam and/or a green light beam. The light valve 30 is disposed on a transmission path of the illumination light beam L1 to convert the illumination light beam L1 into an image light beam L2. The projection lens 40 is disposed on a transmission path of the image light beam L2 to project the image light beam L2 out of the projector 10.

In detail, the light source device 25 used in the embodiment is, for example, a laser diode (LD), such as a laser diode bank. To be specific, any light source that meets a volume requirement in an actual design may be used, which is not limited by the invention. The light valve 30 is, for example, a reflective light modulator such as a liquid crystal on silicon panel (LCoS panel), a digital micro-mirror device (DMD), etc. In an embodiment, the light valve 30 is, for example, a transmissive light modulator such as a transparent liquid crystal panel, an electro-optical modulator, a magneto-optical modulator, an acousto-optic modulator (AOM), etc., but the pattern and type of the light valve 30 are not limited by the embodiment. Regarding the method for the light valve 30 to convert the illumination light beam L1 into the image light beam L2, sufficient teaching, suggestion and implementation description for detailed steps and implementation thereof may be obtained from general knowledge in the technical field, which will not be repeated. In addition, the projection lens 40 includes, for example, a combination of one or more optical lenses with refractive powers, such as various combinations of non-planar lenses such as a biconcave lens, a biconvex lens, a concavo-convex lens, a convexo-concave lens, a plano-convex lens, a planoconcave lens, etc. In an embodiment, the projection lens 40 may also include a planar optical lens to project the image light beam L2 coming from the light valve 30 out of the projector 10 in a reflection or penetration manner. The pattern and type of the projection lens 40 are not limited by the embodiment.

Figure 2A:
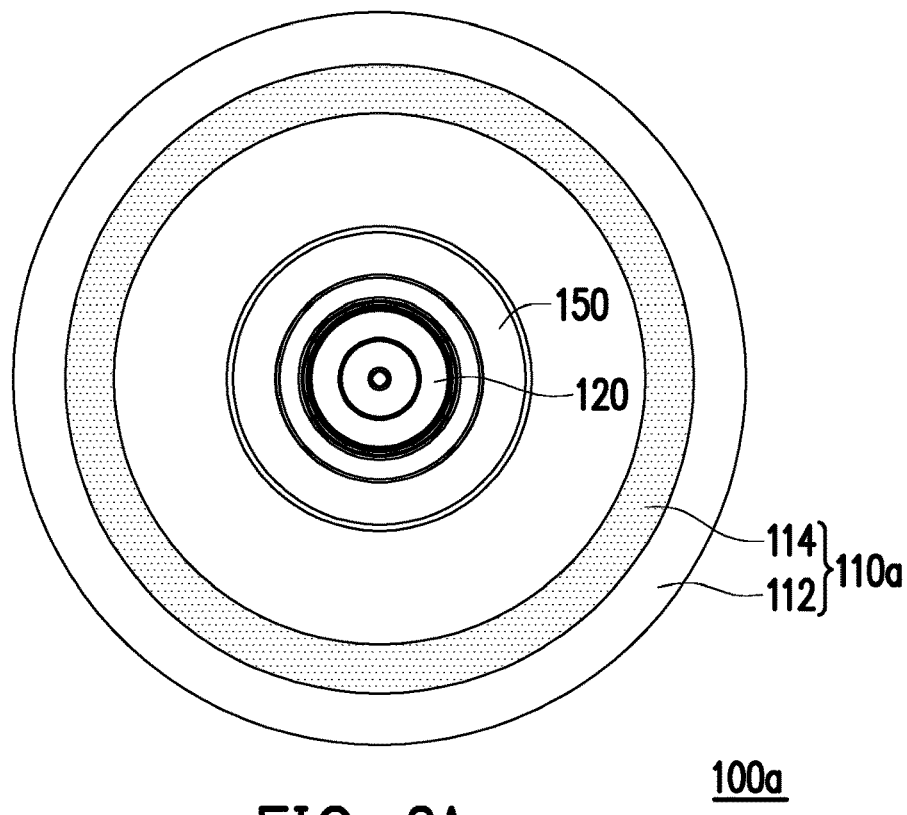
FIG. 2A is a schematic top view of a wavelength conversion module according to an embodiment of the invention.
Figure 2B:
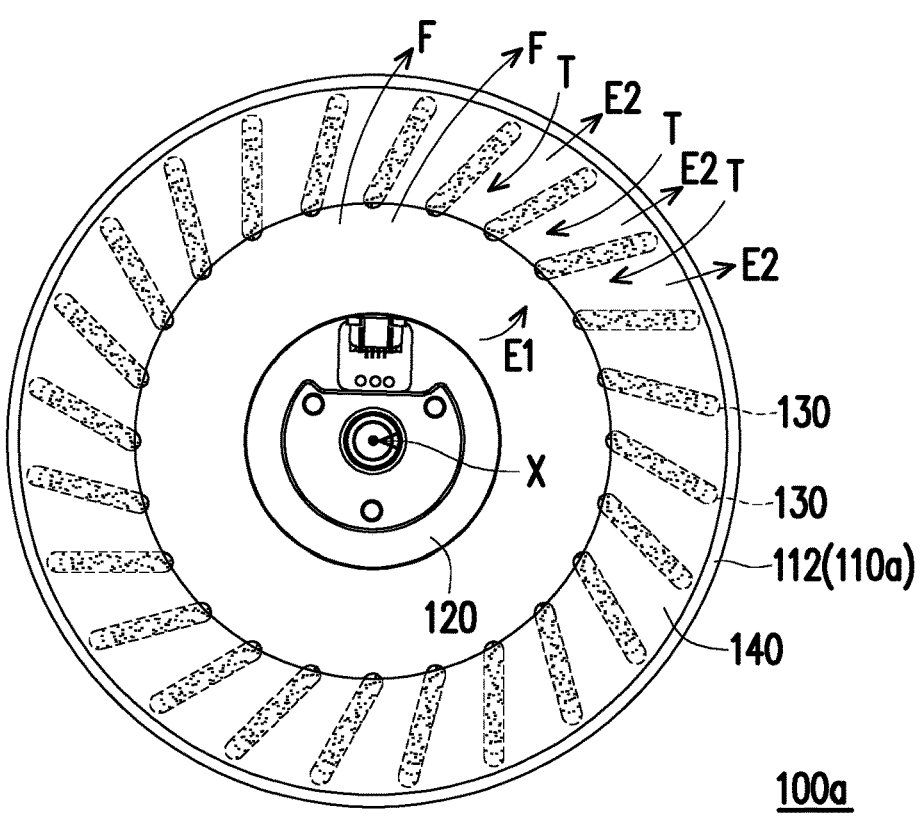
FIG. 2B is a schematic bottom view of the wavelength conversion module of FIG. 2A.
Figure 2C:
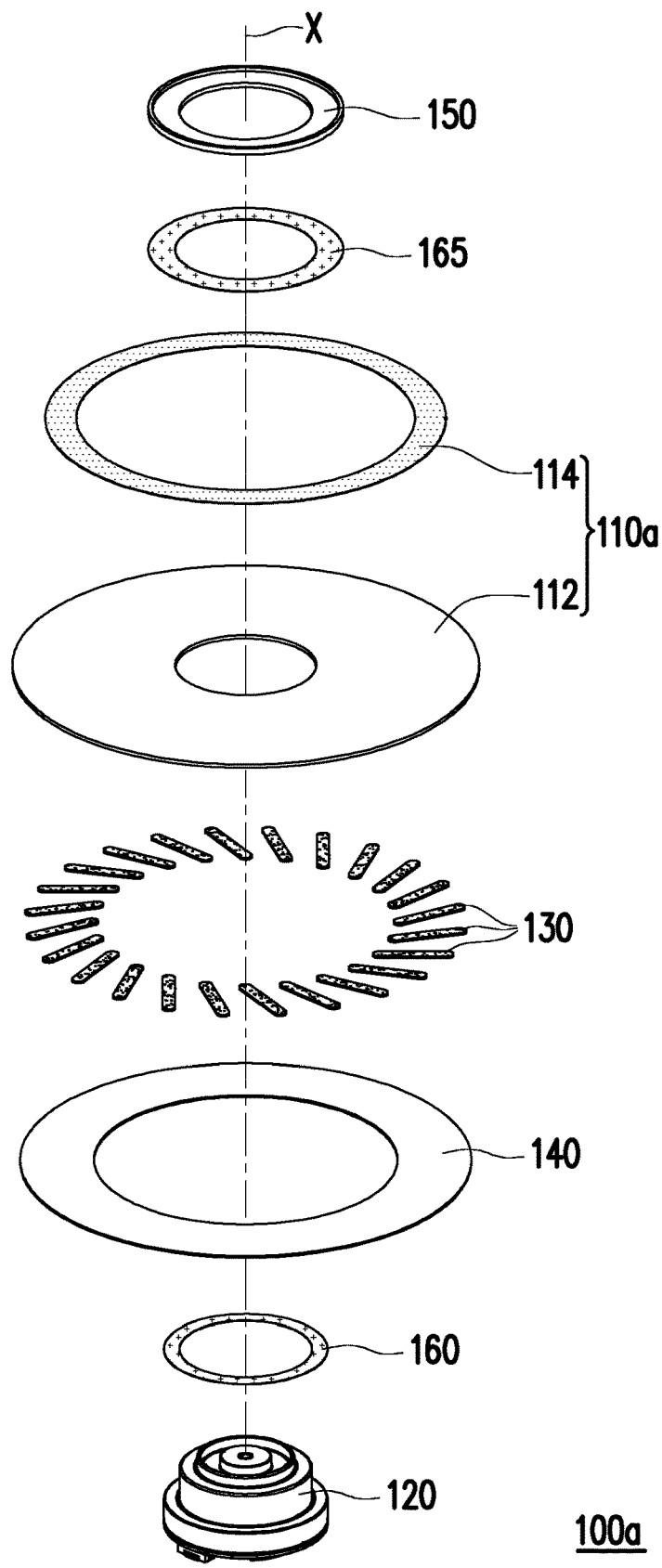
FIG. 2C is a three-dimensional exploded schematic view of the wavelength conversion module of FIG. 2A.
Figure 2D:
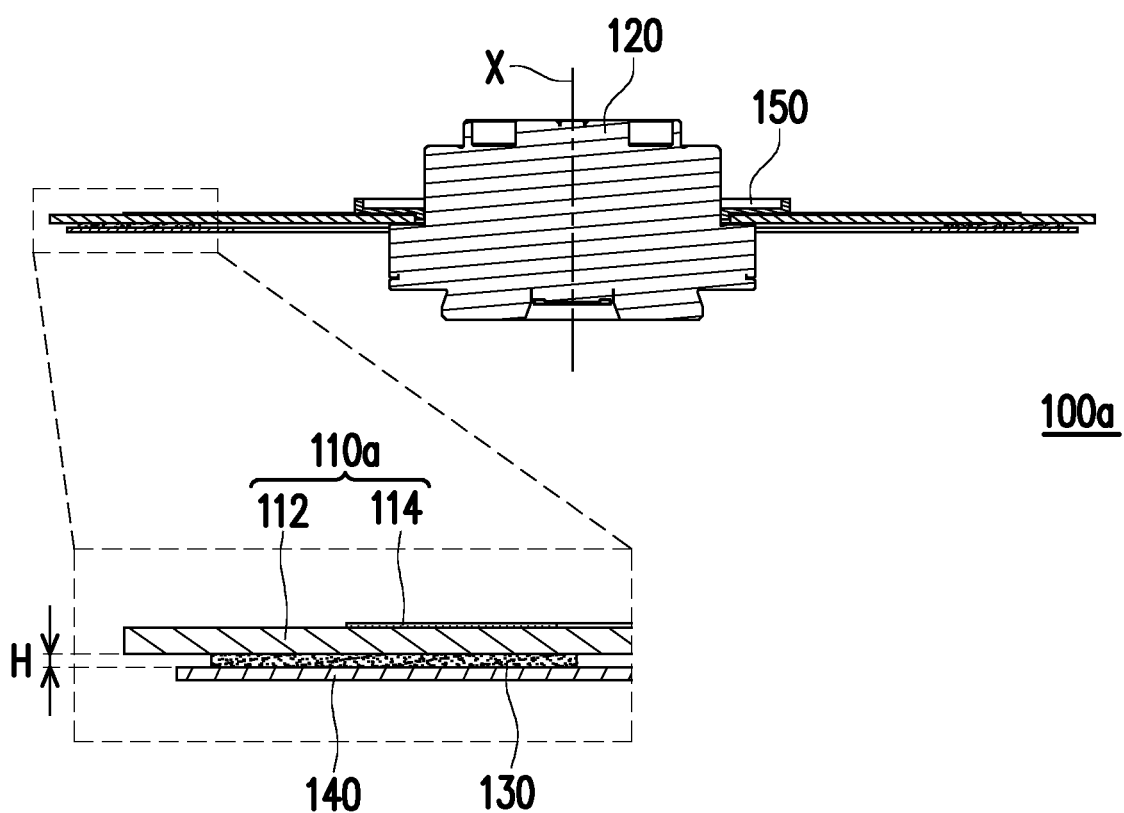
FIG. 2D is a schematic cross-sectional view of the wavelength conversion module of FIG. 2A.

FIG. 2A is a schematic top view of a wavelength conversion module according to an embodiment of the invention. FIG. 2B is a schematic bottom view of the wavelength conversion module of FIG. 2A. FIG. 2C is a three-dimensional exploded schematic view of the wavelength conversion module of FIG. 2A. FIG. 2D is a schematic cross-sectional view of the wavelength conversion module of FIG. 2A. Referring to FIG. 2A, FIG. 2B, and FIG. 2C at the same time, in the embodiment, the wavelength conversion module 100a includes a wavelength conversion wheel 110a, a driving assembly 120, a plurality of thermal conductive adhesive structures 130, and a deflector 140. The wavelength conversion wheel 110a includes a rotatable disc 112 and a wavelength conversion layer 114. The driving assembly 120 is connected to the rotatable disc 112 of the wavelength conversion wheel 110a to drive the wavelength conversion wheel 110a to rotate along an axis X of the driving assembly 120 serving as a central axis. The wavelength conversion layer 114 and the thermal conductive adhesive structures 130 are respectively located on two opposite sides of the rotatable disc 112, and the thermal conductive adhesive structures 130 are arranged at intervals. The deflector 140 is connected to the wavelength conversion wheel 110a along the axis X through the thermal conductive adhesive structures 130, i.e., the thermal conductive adhesive structures 130 are located between the deflector 140 and the rotatable disc 112. A plurality of heat dissipation channels T are formed among the deflector 140, the rotatable disc 112 and the thermal conductive adhesive structures 130, an air inlet E1 is defined by each heat dissipation channel T and the deflector 140 near the axis X, and an air outlet E2 is defined between each heat dissipation channel T and a periphery of the deflector 140. When the wavelength conversion wheel 110a rotates, an airflow F enters the heat dissipation channel T from the air inlet E1 and is discharged from the air outlet E2, where an area of the air inlet E1 of each heat dissipation channel T is larger than an area of the corresponding air outlet E2.

To be specific, a material of the rotatable disc 112 of the wavelength conversion wheel 110a in the embodiment is, for example, aluminum alloy, metal oxide, or silicon carbide. In other words, the rotatable disc 112 is, for example, a metal rotatable disc or a ceramic rotatable disc, which has a better heat dissipation effect. The wavelength conversion layer 114 of the wavelength conversion wheel 110a is, for example, a phosphor layer, which is configured to convert a wavelength of the excitation light beam L' of FIG. 1 to respectively generate the converted light beams L" of different wavelengths. Referring to FIG. 2B and FIG. 2D at the same time, in the embodiment orthogonal projections of the thermal conductive adhesive structures 130 on the rotatable disc 112 in the direction of the axis X are overlapped with an orthogonal projection of the wavelength conversion layer 114 on the rotatable disc 112 in the direction of the axis X. Therefore, the thermal conductive adhesive structures 130 may directly take away heat generated by the wavelength conversion layer 114 by means of thermal conduction. A height H of each thermal conductive adhesive structure 130 is, for example, greater than 0 and less than 8 mm. The height H of the thermal conductive adhesive structure 130 refers to a distance between the thermal conductive adhesive structure 130 and a surface of the rotatable disc 112 in the direction of the axis X, where a material of the thermal conductive adhesive structure 130 is, for example, silica gel, high temperature resistant thermal conductive glue or adhesive glue, but the invention is not limited thereto. A shape of the deflector 140 is, for example, a ring-plate shape, and a material of the deflector 140 is, for example, aluminum alloy, stainless steel, or metal oxide.

It should be noted that a shape of the thermal conductive adhesive structure 130 is not limited by the embodiment, although the shape of the thermal conductive adhesive structure 130 is embodied as an elongated shape, the optimized shape of the thermal conductive adhesive structure 130 may be found based on a heat transfer simulation result. In other words, the shape of the thermal conductive adhesive structure 130 may be changed arbitrarily. In addition, the height H of the thermal conductive adhesive structure 130 is highly related to the heat dissipation effect, so that the height H of the thermal conductive adhesive structure 130 may be adjusted according to different optical engine designs.

In addition, referring to FIG. 2A, FIG. 2C and FIG. 2D, the wavelength conversion module 100a of the embodiment further includes a clamping element 150, which is attached to the wavelength conversion wheel 110a along the axis X. The clamping element 150 and the wavelength conversion layer 114 are located on the same side of the rotatable disc 112, and the shape of the rotatable disc 112 and a shape of the clamping element 150 are respectively a hollow ring shape. The wavelength conversion wheel 110a and the clamping element 150 are respectively arranged coaxially with the driving assembly 120. The driving assembly 120 is, for example, a motor, and the clamping element 150 is, for example, a metal weight ring, but the invention is not limited thereto.

In addition, referring to FIG. 2C again, the wavelength conversion module 100a of the embodiment further includes a first adhesive layer 160 and a second adhesive layer 165. The first adhesive layer 160 is disposed between the driving assembly 120 and the rotatable disc 112 of the wavelength conversion wheel 110a, where the driving assembly 120 is fixed on the rotatable disc 112 through the first adhesive layer 160. The second adhesive layer 165 is disposed between the clamping element 150 and the rotatable disc 112 of the wavelength conversion wheel 110a, where the clamping element 150 is fixed on the rotatable disc 112 through the second adhesive layer 165.

Referring to FIG. 2B, FIG. 2C and FIG. 2D again, when the wavelength conversion module 100a rotates at a high speed, a turbulent flow and a wind flow are generated, so that the airflow F enters the heat dissipation channels T from the air inlets E1 under the wavelength conversion wheel 110a and is discharged from the air outlets E2 to take away the heat energy generated by the wavelength conversion layer 114. Based on the design of the deflector 140, the airflow F may flow into a gap between the deflector 140 and the rotatable disc 112, and flows through the heat dissipation channels T defined by the deflector 140, the rotatable disc 112 and the thermal conductive adhesive structures 130 to effectively and simultaneously take away the heat energy of the thermal conductive adhesive structures 130, the rotatable disc 112, and the wavelength conversion layer 114 on the rotatable disc 112. In addition, when the airflow F flows through the heat dissipation channels T, since the area of the air outlet E2 of each heat dissipation channel T is smaller than the area of the corresponding air inlet E1, i.e., the heat dissipation channel T is contracted, the air flow F may have a local acceleration phenomenon, which results in a better heat dissipation effect. Based on such design, heat dissipation efficiency of the wavelength conversion module 100a may be increased by more than 37%, and excitation efficiency of the wavelength conversion layer 114 may be increased by 5%-10%, and a temperature of the entire wavelength conversion module 100a may be reduced by 20° C. to 30° C. Moreover, since the deflector 140 covers the thermal conductive adhesive structures 130, the thermal conductive adhesive structures 130 are not exposed to the air, a problem of air leakage due to high temperature to cause pollution of optical lenses is avoided. Therefore, based on the design of the aforementioned deflector 140 and the thermal conductive adhesive structures 130, not only the heat dissipation efficiency of the wavelength conversion module 100a is increased, but also structural strength and reliability of the wavelength conversion module 100a are also increased. In another embodiment, an appearance design of the air guide 140 and the design of the thermal conductive adhesive structures 130 may also be used to reduce an initial imbalance, thereby reducing a dynamic balancing time, so as to reduce the cost.

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
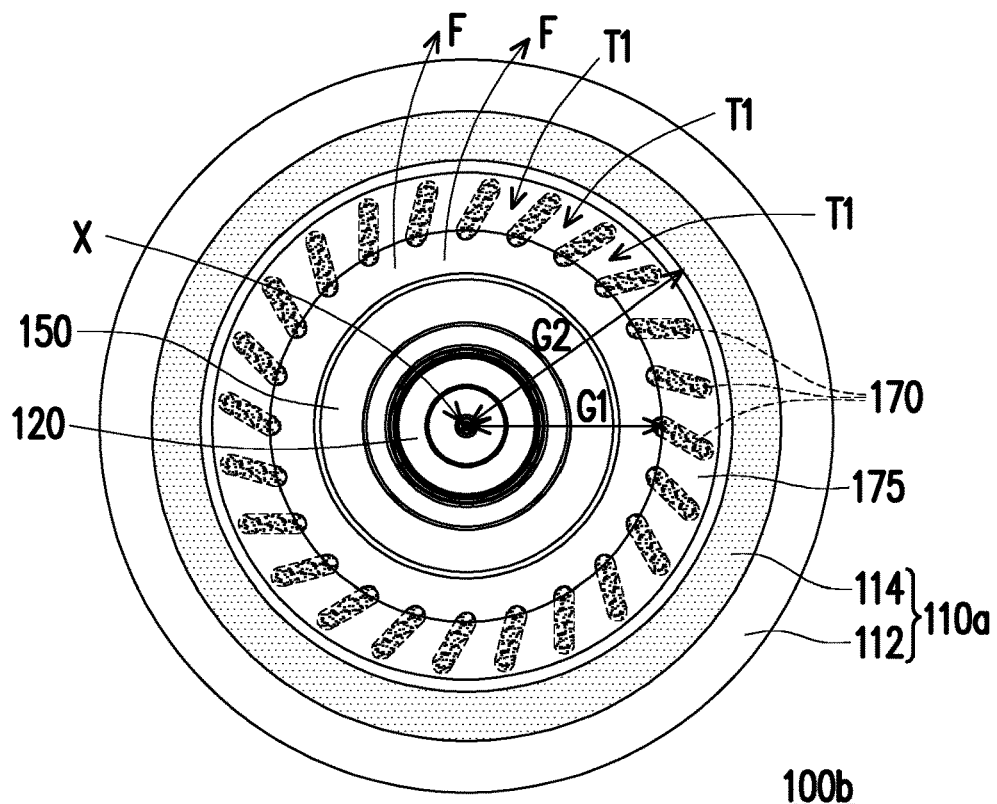
FIG. 3A is a schematic top view of a wavelength conversion module according to another embodiment of the invention.
Figure 3B:
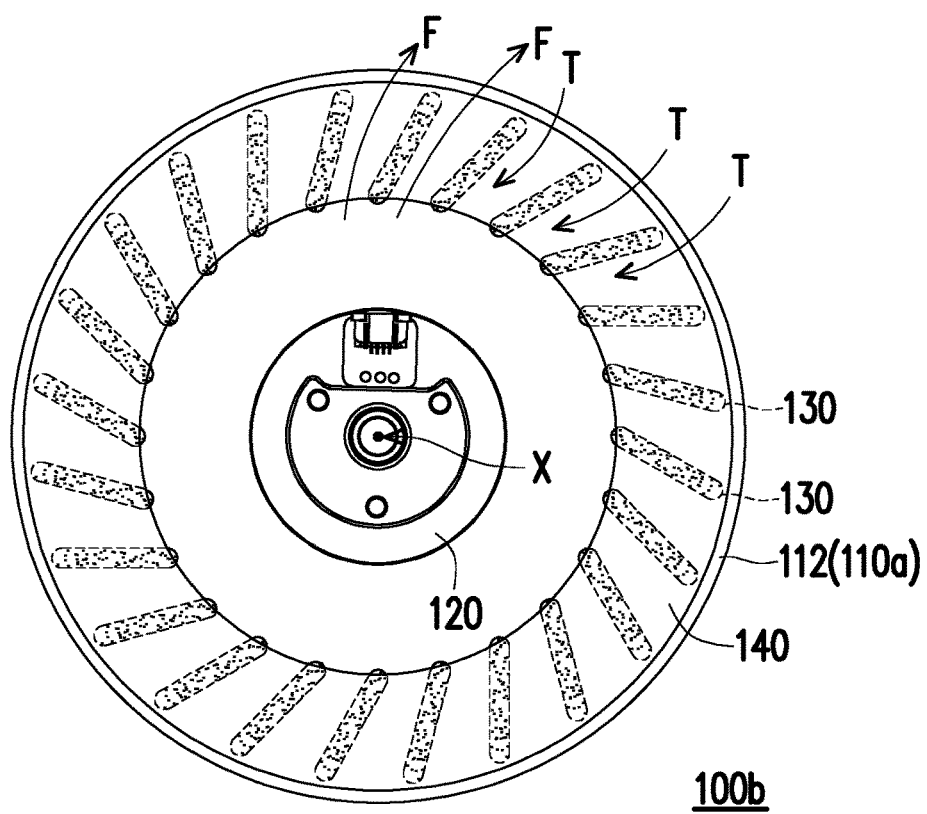
FIG. 3B is a schematic bottom view of the wavelength conversion module of FIG. 3A.
Figure 3C:
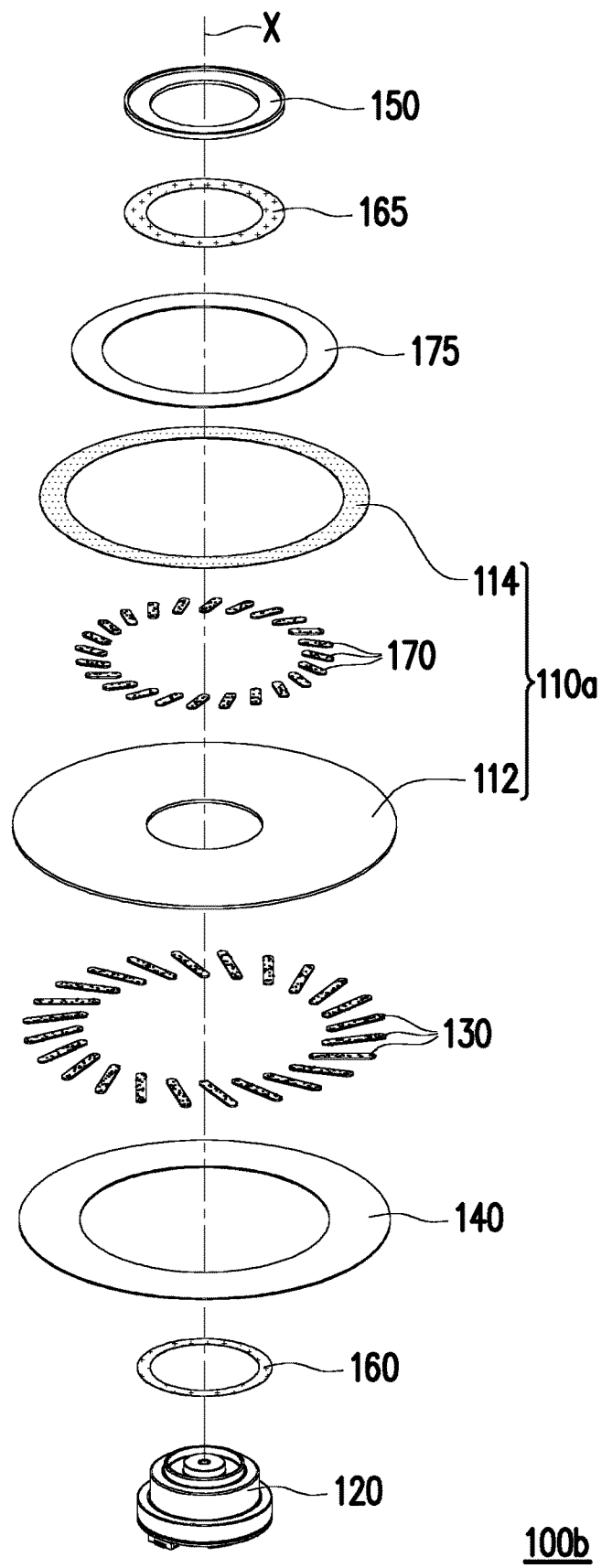
FIG. 3C is a three-dimensional exploded schematic view of the wavelength conversion module of FIG. 3A.
Figure 3D:
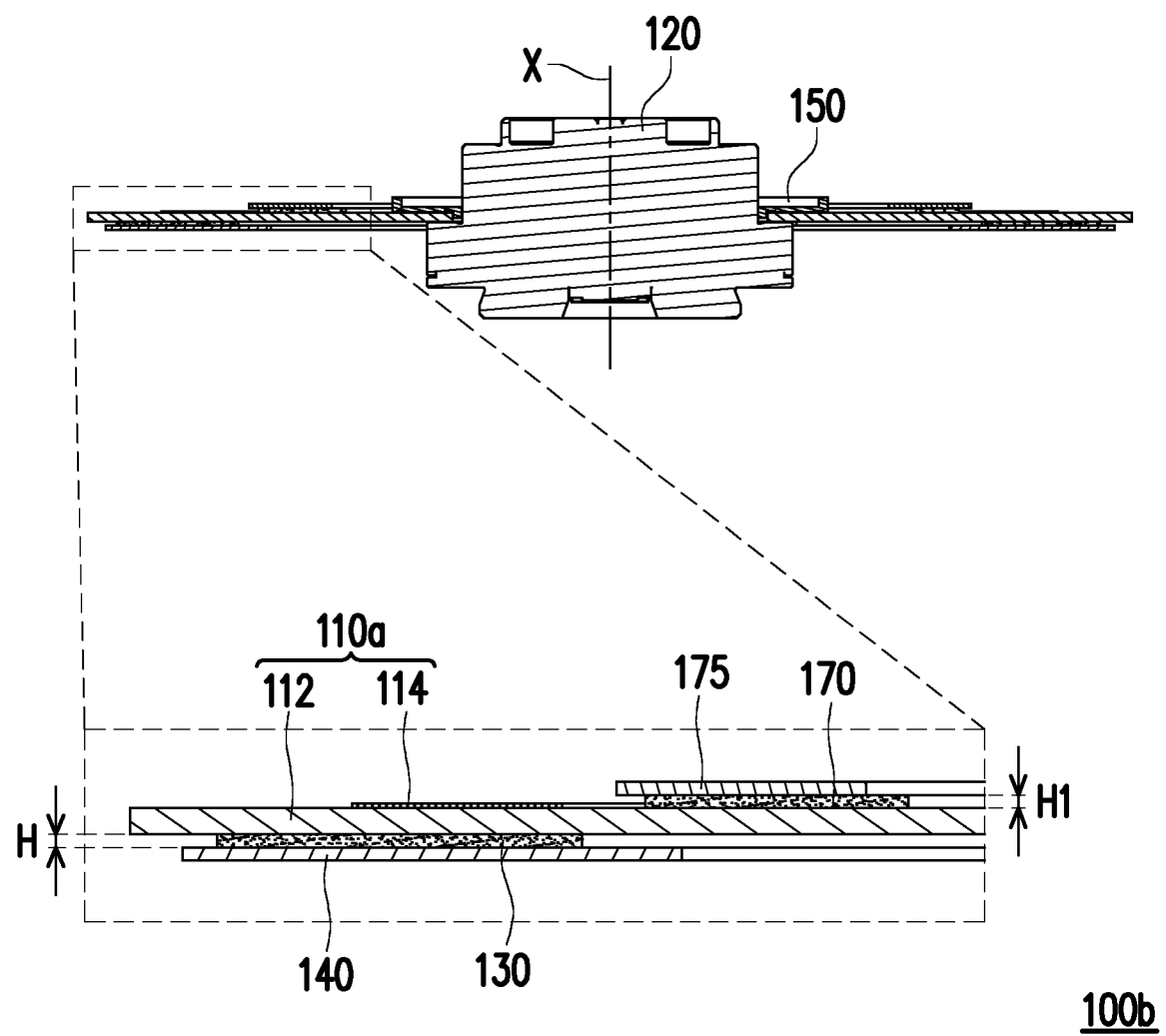
FIG. 3D is a schematic cross-sectional view of the wavelength conversion module of FIG. 3A.

FIG. 3A is a schematic top view of a wavelength conversion module according to another embodiment of the invention. FIG. 3B is a schematic bottom view of the wavelength conversion module of FIG. 3A. FIG. 3C is a three-dimensional exploded schematic view of the wavelength conversion module of FIG. 3A. FIG. 3D is a schematic cross-sectional view of the wavelength conversion module of FIG. 3A. Referring to FIG. 2A, FIG. 2C, FIG. 3A, and FIG. 3C at the same time first, a wavelength conversion module 100b of the embodiment is similar to the wavelength conversion module 100a of FIG. 2A, and a difference there between is that in the embodiment, the wavelength conversion module 100b further includes a plurality of auxiliary thermal conductive adhesive structures 170 and an auxiliary deflector 175. In detail, the auxiliary thermal conductive adhesive structures 170 and the wavelength conversion layer 114 are located on the same side of the rotatable disc 112, and the auxiliary thermal conductive adhesive structures 170 are arranged at intervals between the clamping element 150 and the wavelength conversion layer 114. The auxiliary deflector 175 is connected to the rotatable disc 112 along the axis X through the auxiliary thermal conductive adhesive structures 170, and the auxiliary thermal conductive adhesive structures 170 are located between the auxiliary deflector 175 and the rotatable disc 112. A plurality of auxiliary heat dissipation channels T1 are formed among the auxiliary deflector 175, the wavelength conversion wheel 110a, and the auxiliary thermal conductive adhesive structures 170. As shown in FIG. 3D, orthogonal projections of the auxiliary thermal conductive adhesive structures 170 on the wavelength conversion wheel 110a along the axis X and the orthogonal projections of the thermal conductive adhesive structures 130 on the wavelength conversion wheel 110a along the axis X are arranged in alternation. A height H1 of the auxiliary thermal conductive adhesive structure 170 may be the same as or different from the height H of the thermal conductive adhesive structure 130. The height H1 of the auxiliary thermal conductive adhesive structure 170 refers to a distance between the auxiliary thermal conductive adhesive structure 170 and a surface of the rotatable disc 112 in the direction of the axis X.

Referring to FIG. 3A again, in the embodiment, a shape of the auxiliary deflector 175 is, for example, a ring-plate shape, where the auxiliary deflector 175 and the rotatable disc 112 are arranged coaxially. A distance G1 between the auxiliary deflector 175 and the axis X in a radial direction is smaller than a distance G2 between the wavelength conversion layer 114 and the axis X in the radial direction. In other words, the auxiliary deflector 175 is located inside the wavelength conversion layer 114, and the wavelength conversion layer 114 surrounds the auxiliary deflector 175. Referring to FIG. 3A and FIG. 3B at the same time, in the wavelength conversion module 100b of the embodiment, besides that the airflow F may flow through the heat dissipation channels T defined by the deflector 140, the rotatable disc 112, and the thermal conductive adhesive structures 130 to simultaneously take away the heat energy of the thermal conductive adhesive structures 130, the rotatable disc 112 and the wavelength conversion layer 114 on the rotatable disc 112, the airflow F may also flow through the auxiliary heat dissipation channels T1 defined by the auxiliary deflector 175, the rotatable disc 112, and the thermal conductive adhesive structures 170 to simultaneously take away the heat energy of the thermal conductive adhesive structures 170 and the rotatable disc 112. In this way, the heat dissipation efficiency of the wavelength conversion module 100b may be effectively improved.

Figure 4A:
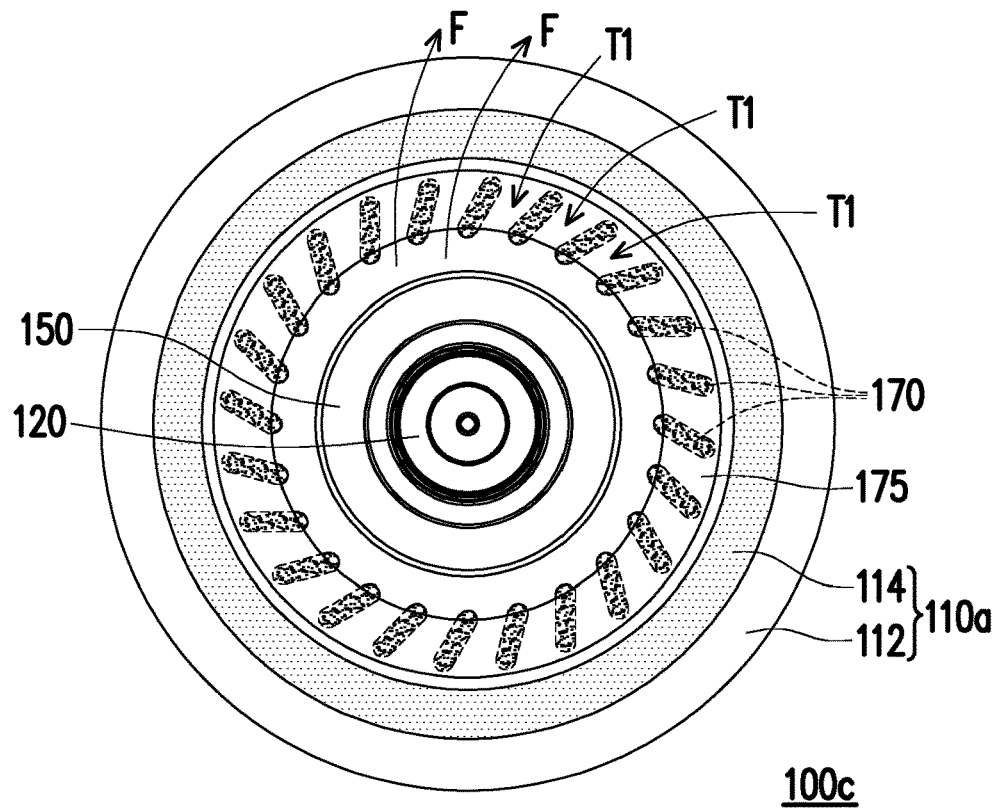
FIG. 4A is a schematic top view of a wavelength conversion module according to another embodiment of the invention.
Figure 4B:
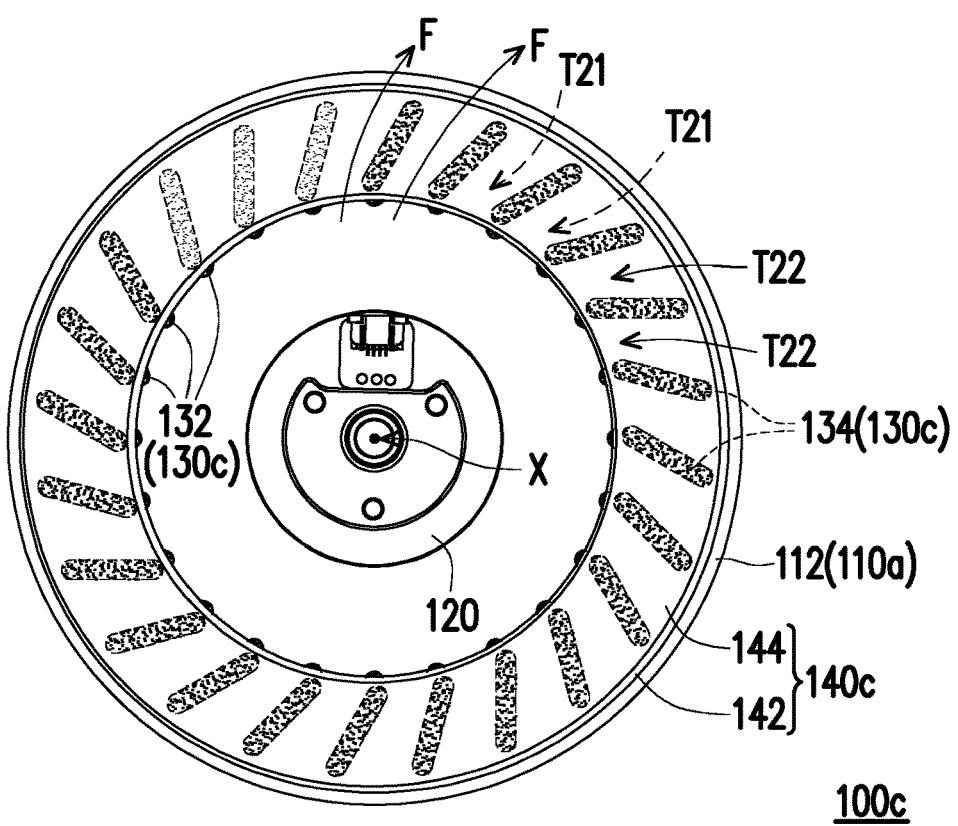
FIG. 4B is a schematic bottom view of the wavelength conversion module of FIG. 4A.
Figure 4C:
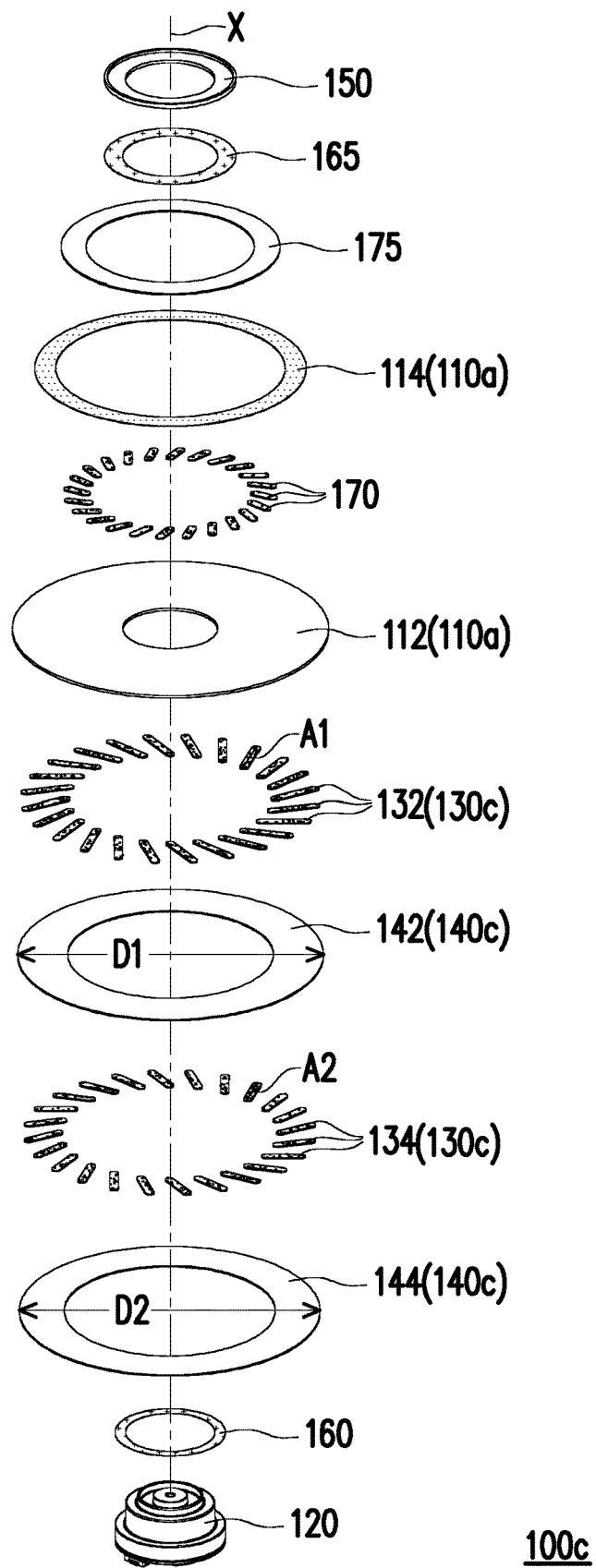
FIG. 4C is a three-dimensional exploded schematic view of the wavelength conversion module of FIG. 4A.
Figure 4D:
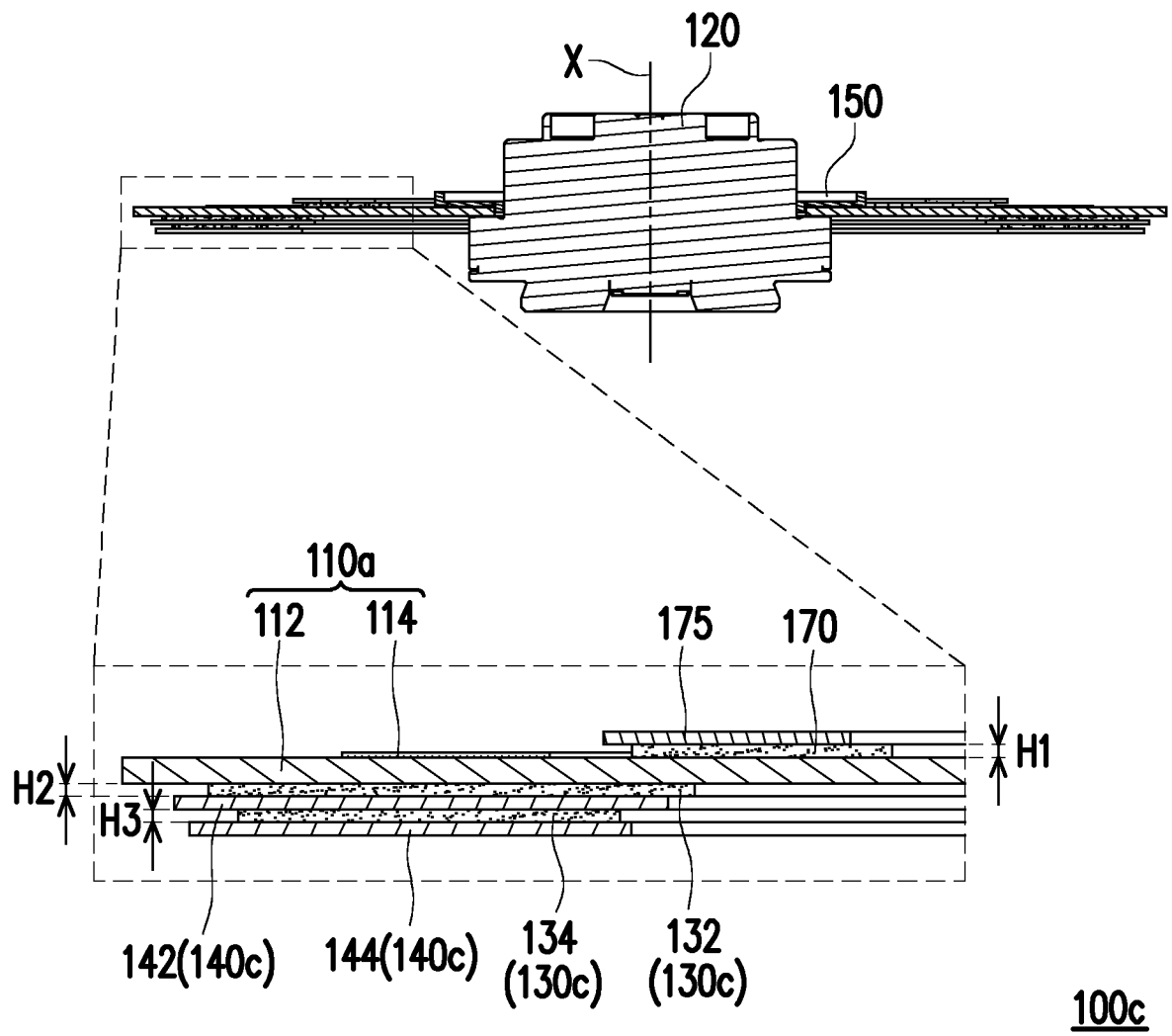
FIG. 4D is a schematic cross-sectional view of the wavelength conversion module of FIG. 4A.

FIG. 4A is a schematic top view of a wavelength conversion module according to another embodiment of the invention. FIG. 4B is a schematic bottom view of the wavelength conversion module of FIG. 4A. FIG. 4C is a three-dimensional exploded schematic view of the wavelength conversion module of FIG. 4A. FIG. 4D is a schematic cross-sectional view of the wavelength conversion module of FIG. 4A. Referring to FIG. 3B, FIG. 3C, FIG. 4B, and FIG. 4C at the same time first, a wavelength conversion module 100c of the embodiment is similar to the wavelength conversion module 100b of FIG. 3B, and a difference there between is that in the embodiment, the deflector 140c includes a first deflector 142 and a second deflector 144, and the thermal conductive adhesive structures 130c include a plurality of first thermal conductive adhesive blocks 132 and a plurality of second thermal conductive adhesive blocks 134. In detail, the first thermal conductive adhesive blocks 132 are arranged at intervals between the rotatable disc 112 and the first deflector 142. The first deflector 142 is fixed on the rotatable disc 112 of the wavelength conversion wheel 110a through the first thermal conductive adhesive blocks 132. The second thermal conductive adhesive blocks 134 are arranged at intervals between the first deflector 142 and the second deflector 144, and the second deflector 144 is fixed on the first deflector 142 through the second thermal conductive adhesive blocks 134. The first deflector 142 is located between the second deflector 144 and the rotatable disc 112, where the first deflector 142 and the second deflector 144 both have a ring-plate shape, and the first deflector 142, the second deflector 144 and the rotatable disc 112 are arranged coaxially.

Further, referring to FIG. 4C again, in the embodiment, a diameter D1 of the first deflector 142 is greater than a diameter D2 of the second deflector 144. Namely, a shape of the deflector 140c is, for example, a funnel shape, which gradually decreases in size from a part adjacent to the rotatable disc 112 to a direction away from the rotatable disc 112. A length A1 of each first thermal conductive adhesive block 132 is greater than a length A2 of each second thermal conductive adhesive block 134, which means that the first thermal conductive adhesive block 132 and the second thermal conductive adhesive block 134 have different heat dissipation areas. As shown in FIG. 4B and FIG. 4D, orthogonal projections of the first thermal conductive adhesive blocks 132 on the wavelength conversion wheel 110a in the direction of the axis X and orthogonal projections of the second thermal conductive adhesive blocks 134 on the wavelength conversion wheel 110a in the direction of the axis X are overlapped. In another embodiment, the orthogonal projections of the first thermal conductive adhesive blocks 132 on the wavelength conversion wheel 110a in the direction of the axis X and the orthogonal projections of the second thermal conductive adhesive blocks 134 on the wavelength conversion wheel 110a in the direction of the axis X are alternately arranged, which still belongs to a protection scope of the invention. A height H2 of the first thermal conductive adhesive block 132, a height H3 of the second thermal conductive adhesive block 134, and the height H1 of the auxiliary thermal conductive adhesive structure 170 may be the same or different. The height H2 of the first thermal conductive adhesive block 132 refers to a distance between the first thermal conductive adhesive block 132 and the surface of the rotatable disc 112 in the direction of the axis X, and the height H3 of the second thermal conductive adhesive block 134 refers to a distance between the second thermal conductive adhesive block 134 and a surface of the first deflector 142 in the direction of the axis X.

Referring to FIG. 4A and FIG. 4B at the same time, in the wavelength conversion module 100c of the embodiment, besides that the airflow F may flow through the heat dissipation channels T21 defined by the first deflector 142 of the deflector 140c, the rotatable disc 112, and the first thermal conductive adhesive blocks 132 of the thermal conductive adhesive structures 130c, and flow through the heat dissipation channels T22 defined by the second deflector 144 of the deflector 140c, the rotatable disc 112, and the second thermal conductive adhesive blocks 134 of the thermal conductive adhesive structures 130c to simultaneously take away the heat energy of the thermal conductive adhesive structures 130c, the rotatable disc 112, and the wavelength conversion layer 114 on the rotatable disc 112, the airflow F may also flow through the auxiliary heat dissipation channels T1 defined by the auxiliary deflector 175, the wavelength conversion wheel 110a, and the auxiliary thermal conductive adhesive structures 170 to simultaneously take away the heat energy of the auxiliary thermal conductive adhesive structures 170 and the rotatable disc 112. In this way, the heat dissipation efficiency of the wavelength conversion module 100c may be effectively improved.

Figure 5A:
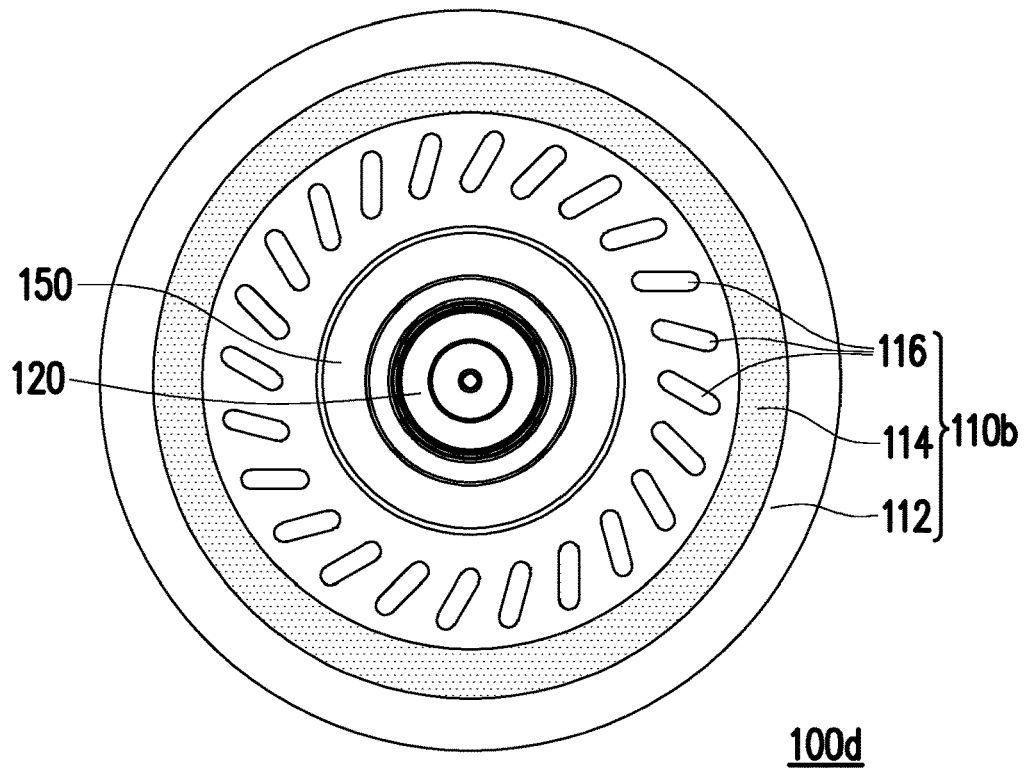
FIG. 5A is a schematic top view of a wavelength conversion module according to another embodiment of the invention.
Figure 5B:
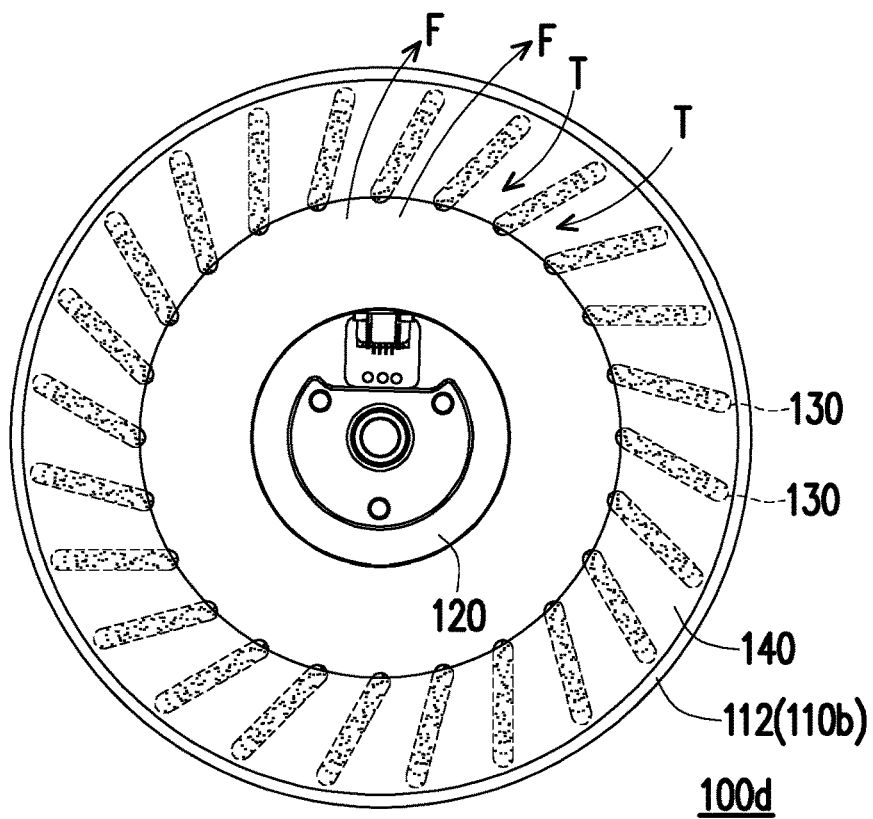
FIG. 5B is a schematic bottom view of the wavelength conversion module of FIG. 5A.
Figure 5C:
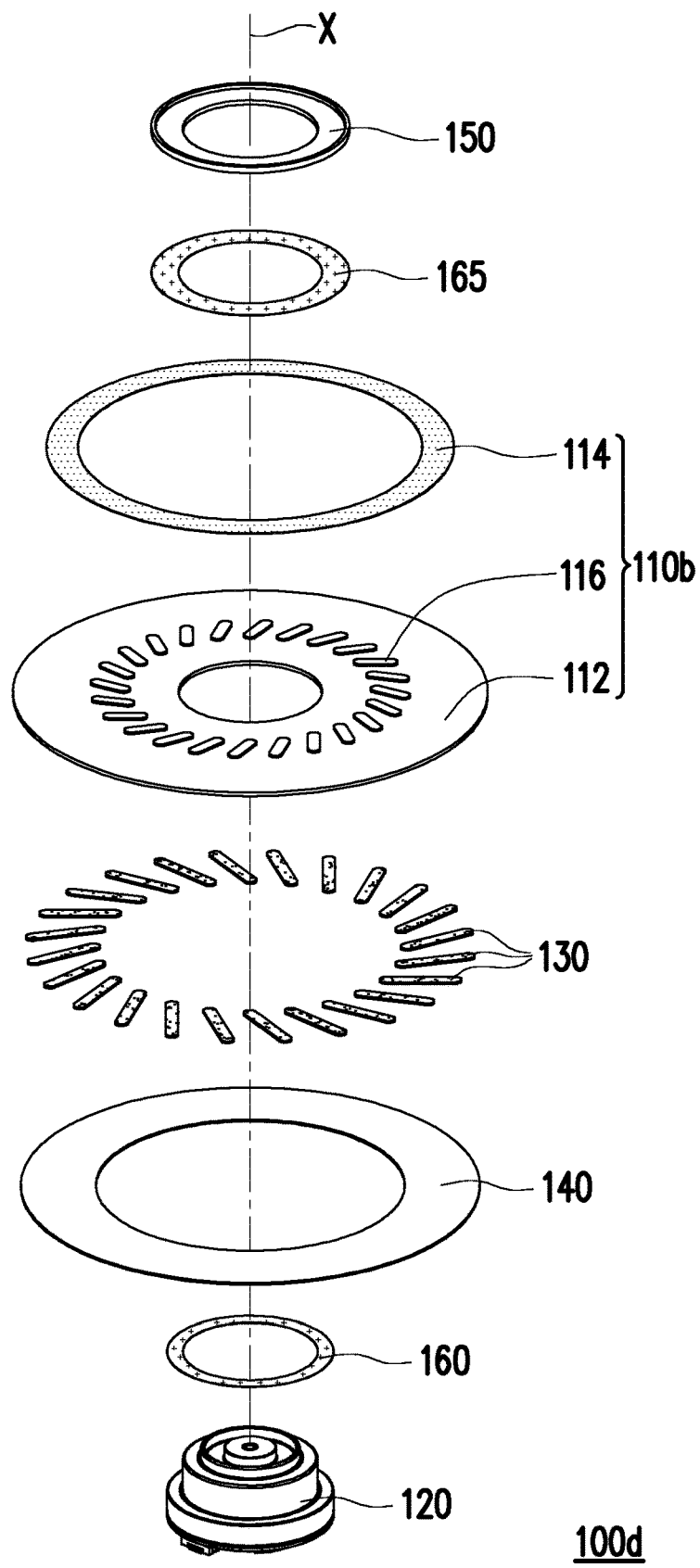
FIG. 5C is a three-dimensional exploded schematic view of the wavelength conversion module of FIG. 5A.
Figure 5D:
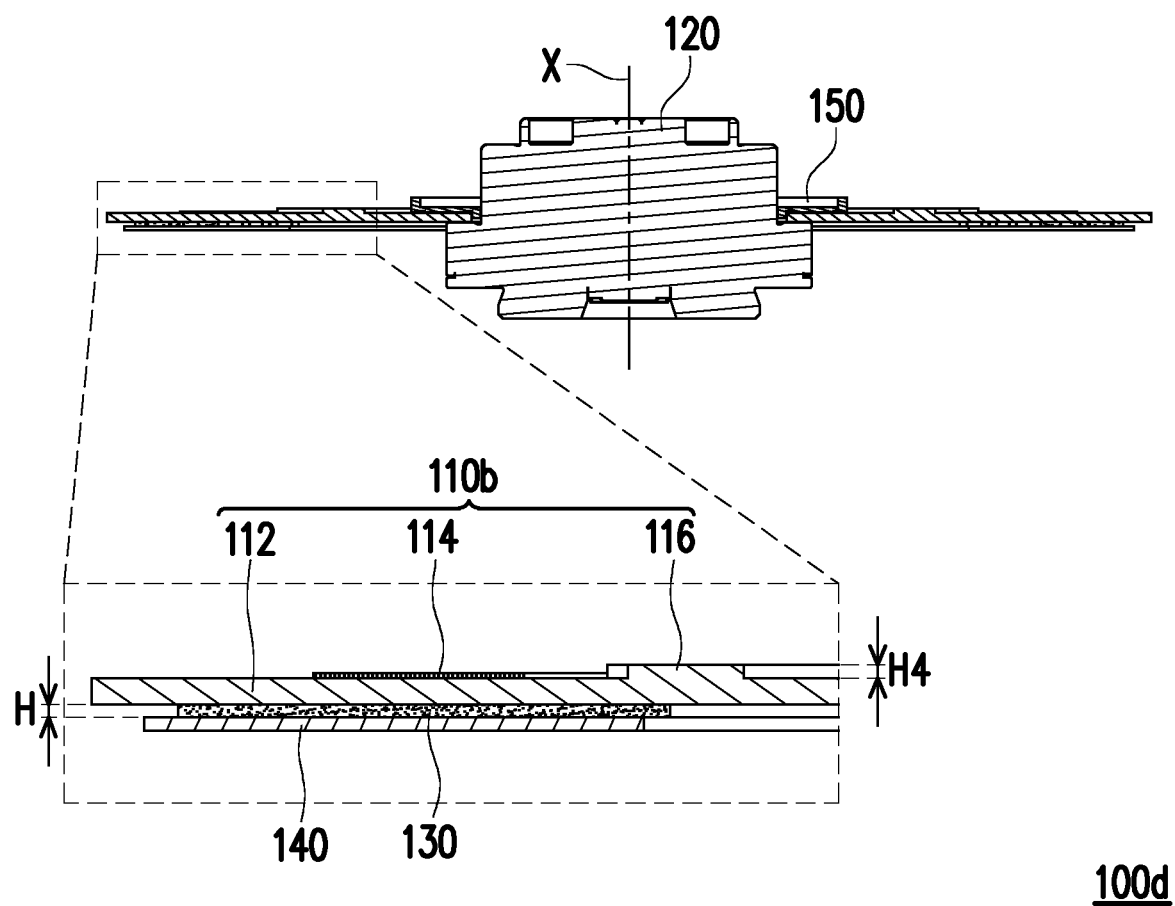
FIG. 5D is a schematic cross-sectional view of the wavelength conversion module of FIG. 5A.

FIG. 5A is a schematic top view of a wavelength conversion module according to another embodiment of the invention. FIG. 5B is a schematic bottom view of the wavelength conversion module of FIG. 5A. FIG. 5C is a three-dimensional exploded schematic view of the wavelength conversion module of FIG. 5A. FIG. 5D is a schematic cross-sectional view of the wavelength conversion module of FIG. 5A. Referring to FIG. 2A, FIG. 2C, FIG. 5B, and FIG. 5C at the same time first, a wavelength conversion module 100d of the embodiment is similar to the wavelength conversion module 100a of FIG. 2A, and a difference there between is that in the embodiment, the wavelength conversion wheel 110b further includes a plurality of heat dissipation bosses 116 protruding from the rotatable disc 112 and formed integrally with the rotatable disc 112. Namely, the heat dissipation bosses 116 and the rotatable disc 112 are made of the same material, such as aluminum alloy, which has a better heat dissipation effect and high reflectivity. The heat dissipation bosses 116 are located between the wavelength conversion layer 114 and the clamping element 150 in the radial direction.

Referring to FIG. 5A and FIG. 5B again, in the wavelength conversion module 100d of the embodiment, besides that the airflow F may flow through the heat dissipation channels T defined by the deflector 140, the rotatable disc 112, and the thermal conductive adhesive structures 130 to simultaneously take away the heat energy of the thermal conductive adhesive structures 130, the rotatable disc 112 and the wavelength conversion layer 114 on the rotatable disc 112, the heat energy generated by the wavelength conversion layer 114 may also be taken away by the heat dissipation bosses 116 on the rotatable disc 112. In this way, the heat dissipation efficiency of the wavelength conversion module 100d may be effectively improved. Referring to FIG. 5D, the height H of the thermal conductive adhesive structure 130 and a height H4 of the heat dissipation boss 116 may be the same or different. The height H4 of the heat dissipation boss 116 refers to a distance between the heat dissipation boss 116 and a surface of the rotatable disc 112 in the direction of the axis X.

Figure 6A:
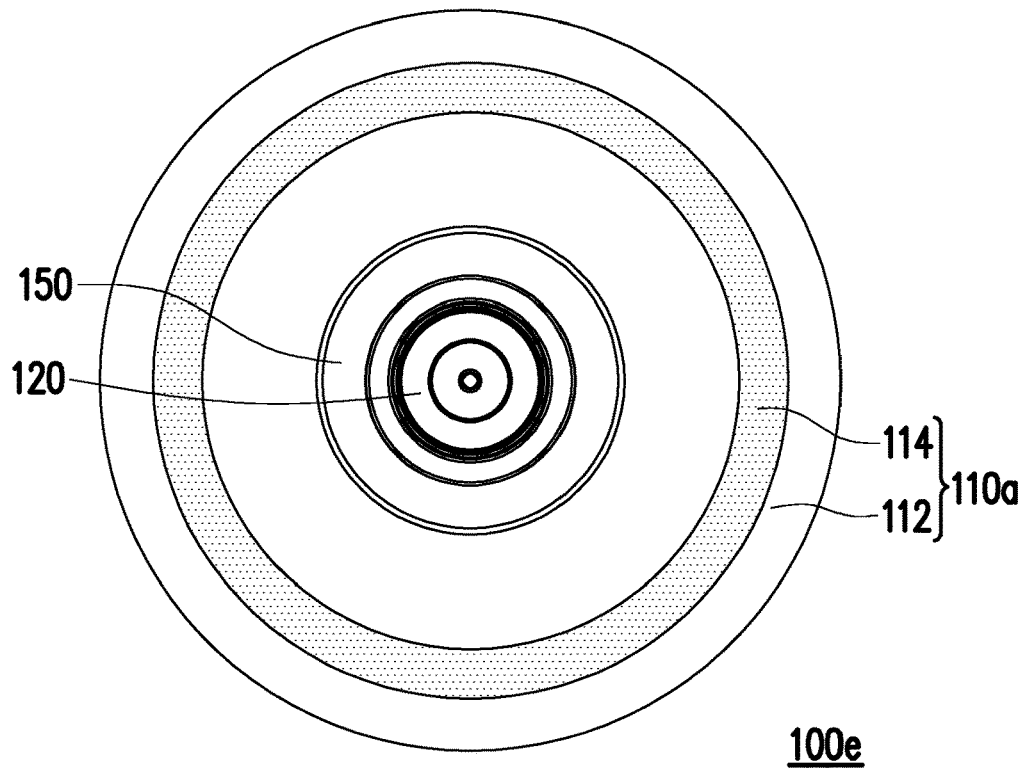
FIG. 6A is a schematic top view of a wavelength conversion module according to another embodiment of the invention.
Figure 6B:
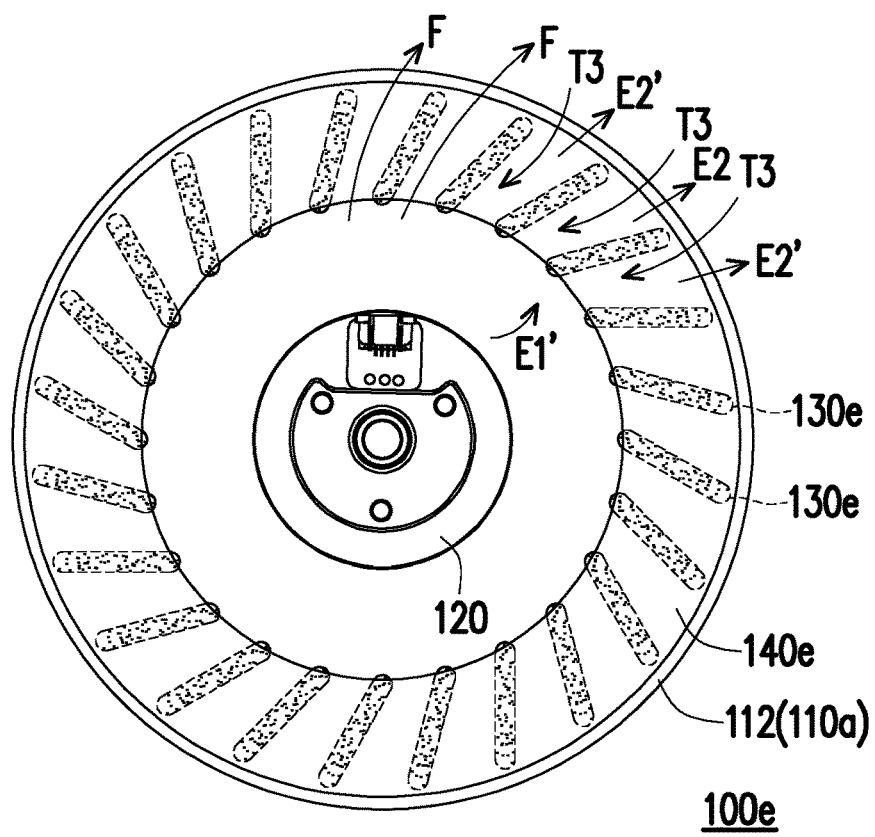
FIG. 6B is a schematic bottom view of the wavelength conversion module of FIG. 6A.
Figure 6C:
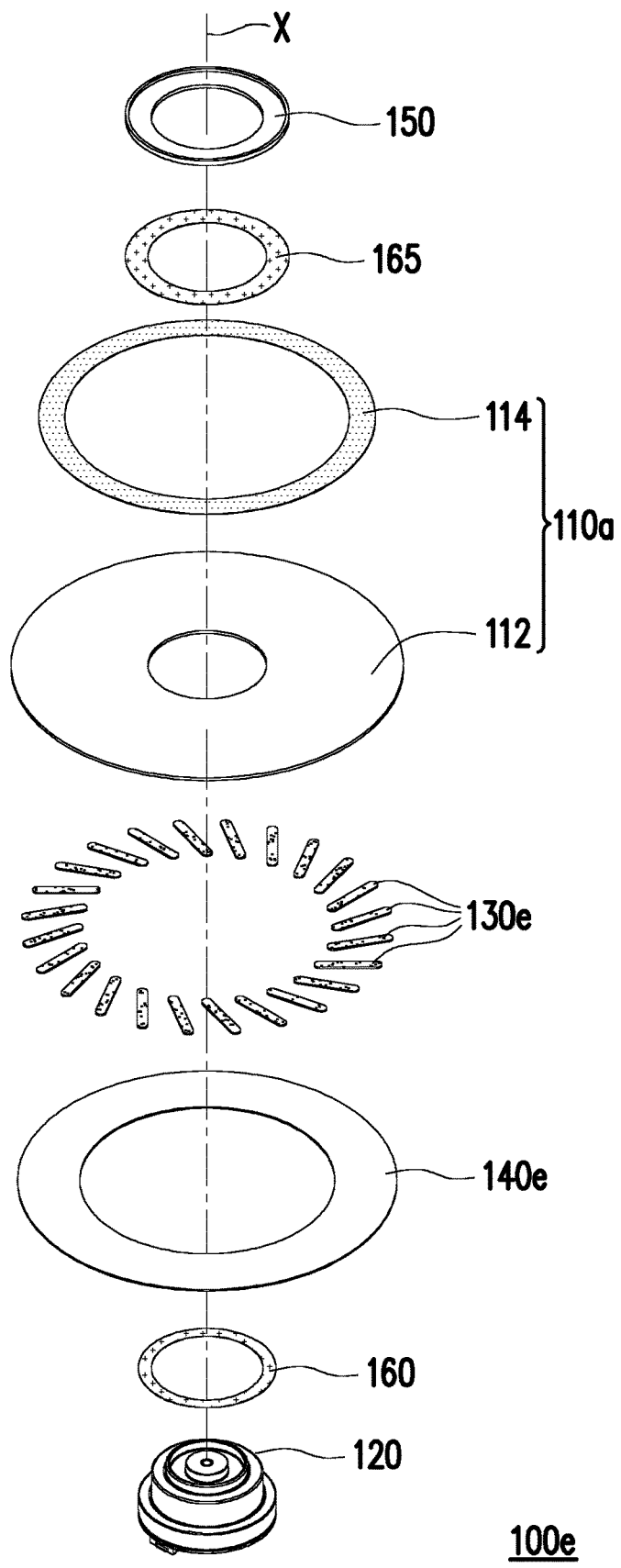
FIG. 6C is a three-dimensional exploded schematic view of the wavelength conversion module of FIG. 6A.
Figure 6D:
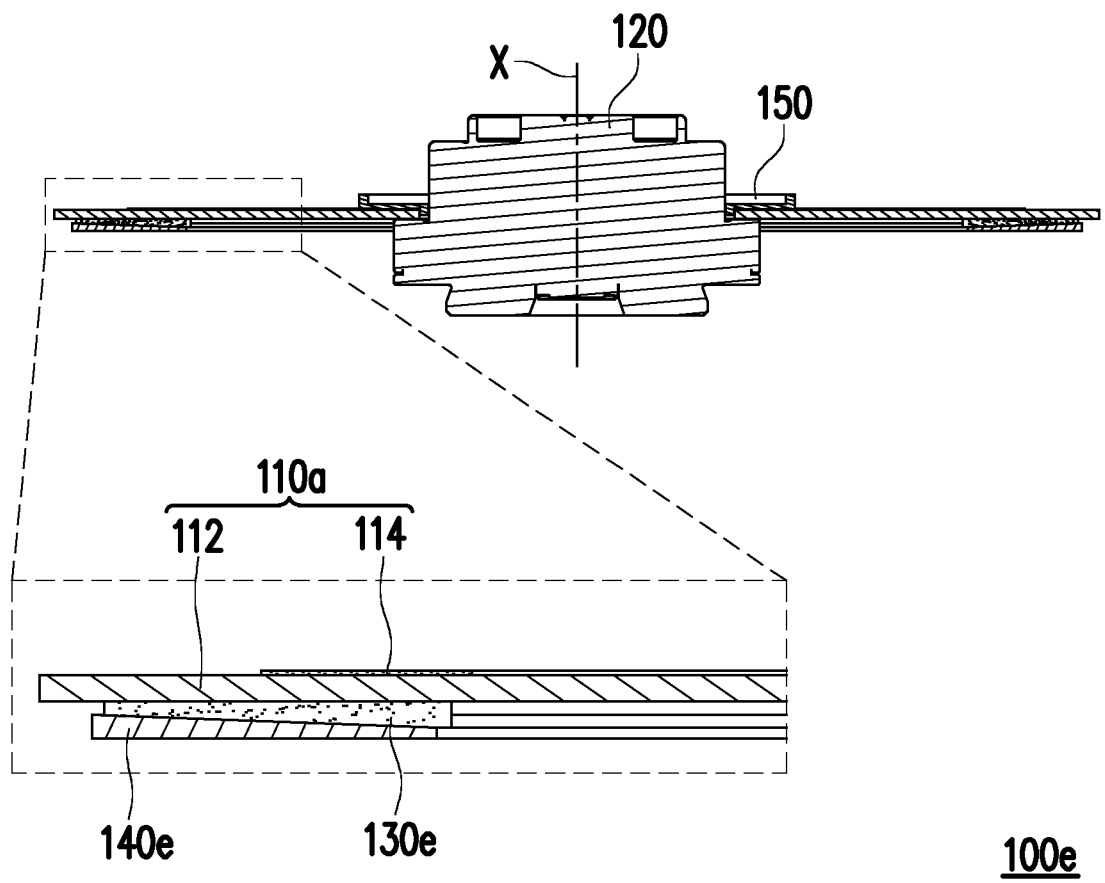
FIG. 6D is a schematic cross-sectional view of the wavelength conversion module of FIG. 6A.

FIG. 6A is a schematic top view of a wavelength conversion module according to another embodiment of the invention. FIG. 6B is a schematic bottom view of the wavelength conversion module of FIG. 6A. FIG. 6C is a three-dimensional exploded schematic view of the wavelength conversion module of FIG. 6A. FIG. 6D is a schematic cross-sectional view of the wavelength conversion module of FIG. 6A. Referring to FIG. 2C, FIG. 2D, FIG. 6C, and FIG. 6D at the same time first, in the embodiment, the deflector 140e and the rotatable disc 112 of the wavelength conversion wheel 110a are arranged in a non-parallel manner. In detail, the deflector 140e has an uneven thickness, and in the radial direction perpendicular to the axis X, the thickness of the deflector 140e gradually increases from a part adjacent to the axis X to a direction away from the axis X. Furthermore, each thermal conductive adhesive structure 130e of the embodiment has an uneven thickness, and in the radial direction perpendicular to the axis X, the thickness of each thermal conductive adhesive structure 130e gradually decreases from the part adjacent to the axis X to the direction away from the axis X. Referring to FIG. 6A and FIG. 6B at the same time, since a surface of the deflector 140e facing the rotatable disc 112 and the surface of the rotatable disc 112 in the embodiment are not parallel to each other, the air inlets E1' and the air outlets E2' of the heat dissipation channels T3 defined by the deflector 140e, the rotatable disc 112, and the thermal conductive adhesive structures 130e have different areas, so that a flow velocity of the airflow F in the heat dissipation channels T3 may be accelerated to further improve the heat dissipation effect of the wavelength conversion module 100e.

In summary, the embodiments of the invention have at least one of the following advantages or effects. In the wavelength conversion module of the invention, the deflector is connected to the wavelength conversion wheel along the axis through the thermal conductive adhesive structures, where a plurality of heat dissipation channels are formed among the deflector, the rotatable disc and the thermal conductive adhesive structures. When the wavelength conversion wheel rotates, the airflow enters the heat dissipation channel from the air inlet with a larger area, and is discharged from the air outlet with a smaller area. During the guiding process, by sandwiching the thermal conductive adhesive structures between the detector and the rotatable disc, the airflow passing through the wavelength conversion wheel may take away heat energy, and a flow velocity of the airflow may be faster, thereby increasing the heat dissipation efficiency of the wavelength conversion module. In addition, the projector adopting the wavelength conversion module of the invention may have better projection quality, thereby enhancing product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a wavelength conversion wheel, a driving assembly, a plurality of thermal conductive adhesive structures, and a deflector, wherein the wavelength conversion wheel comprises a rotatable disc and a wavelength conversion layer;

the driving assembly is connected to the rotatable disc of the wavelength conversion wheel to drive the wavelength conversion wheel to rotate along an axis of the driving assembly serving as a central axis;

the wavelength conversion layer and the thermal conductive adhesive structures are respectively located on two opposite sides of the rotatable disc, and the thermal conductive adhesive structures are arranged at intervals; and the deflector is connected to the wavelength conversion wheel along the axis through the thermal conductive adhesive structures, wherein a plurality of heat dissipation channels are formed among the deflector, the rotatable disc and the thermal conductive adhesive structures, an air inlet is defined by each of the heat dissipation channels and the deflector near the axis, and an air outlet is defined between each of the heat dissipation channels and a periphery of the deflector, when the wavelength conversion wheel rotates, an airflow enters each of the heat dissipation channels from the air inlet and is discharged from the air outlet, wherein an area of the air inlet is larger than an area of the air outlet.

2. The wavelength conversion module as claimed in claim 1, further comprising:

a clamping element, attached to the wavelength conversion wheel along the axis, wherein the clamping element and the wavelength conversion layer are located on a same side of the rotatable disc, and a shape of the rotatable disc and a shape of the clamping element are respectively a hollow ring shape, and the wavelength conversion wheel and the clamping element are respectively arranged coaxially with the driving assembly.

3. The wavelength conversion module as claimed in claim 2, further comprising a first adhesive layer and a second adhesive layer, wherein
the first adhesive layer is disposed between the driving assembly and the rotatable disc of the wavelength conversion wheel; and
the second adhesive layer is disposed between the clamping element and the rotatable disc of the wavelength conversion wheel.

4. The wavelength conversion module as claimed in claim 2, further comprising a plurality of auxiliary thermal conductive adhesive structures and an auxiliary deflector, wherein
the auxiliary thermal conductive adhesive structures and the wavelength conversion layer are located on a same side of the rotatable disc, and the auxiliary thermal conductive adhesive structures are arranged at intervals between the clamping element and the wavelength conversion layer; and
the auxiliary deflector is connected to the rotatable disc along the axis through the auxiliary thermal conductive adhesive structures, wherein a plurality of auxiliary heat dissipation channels are formed among the auxiliary deflector, the wavelength conversion wheel, and the auxiliary thermal conductive adhesive structures.

5. The wavelength conversion module as claimed in claim 1, wherein the deflector comprises a first deflector and a second deflector, the thermal conductive adhesive structures comprise a plurality of first thermal conductive adhesive blocks and a plurality of second thermal conductive adhesive blocks, the first thermal conductive adhesive blocks are arranged between the rotatable disc and the first deflector, and the first deflector is fixed on the rotatable disc of the wavelength conversion wheel through the first thermal conductive adhesive blocks, while the second thermal conductive adhesive blocks are arranged between the first deflector and the second deflector, and the second deflector is fixed on the first deflector through the second thermal conductive adhesive blocks, and the first deflector is located between the second deflector and the rotatable disc.

6. The wavelength conversion module as claimed in claim 5, wherein a diameter of the first deflector is larger than a diameter of the second deflector.

7. The wavelength conversion module as claimed in claim 5, wherein a length of each of the first thermal conductive adhesive blocks is greater than a length of each of the second thermal conductive adhesive blocks.

8. The wavelength conversion module as claimed in claim 5, wherein orthogonal projections of the first thermal conductive adhesive blocks on the wavelength conversion wheel in a direction of the axis and orthogonal projections of the second thermal conductive adhesive blocks on the wavelength conversion wheel in the direction of the axis are overlapped.

9. The wavelength conversion module as claimed in claim 2, wherein the wavelength conversion wheel further comprises a plurality of heat dissipation bosses protruding from the rotatable disc and formed integrally with the rotatable disc, and the heat dissipation bosses are located between the wavelength conversion layer and the clamping element.

10. The wavelength conversion module as claimed in claim 1, wherein the deflector and the rotatable disc of the wavelength conversion wheel are arranged in a non-parallel manner.

11. The wavelength conversion module as claimed in claim 10, wherein the deflector has an uneven thickness.

12. The wavelength conversion module as claimed in claim 11, wherein in a radial direction perpendicular to the axis, the thickness of the deflector gradually increases from a part adjacent to the axis toward a direction away from the axis.

13. The wavelength conversion module as claimed in claim 10, wherein each of the thermal conductive adhesive structures has an uneven thickness.

14. The wavelength conversion module as claimed in claim 13, wherein in a radial direction perpendicular to the axis, the thickness of each of the thermal conductive adhesive structures gradually decreases from a part adjacent to the axis to a direction away from the axis.

15. The wavelength conversion module as claimed in claim 1, wherein orthogonal projections of the thermal conductive adhesive structures on the rotatable disc along a direction of the axis are overlapped with an orthogonal projection of the wavelength conversion layer on the rotatable disc along the direction of the axis.

16. The wavelength conversion module as claimed in claim 1, wherein a shape of the deflector comprises a ring plate shape or a funnel shape.

17. The wavelength conversion module as claimed in claim 1, wherein a height of each of the thermal conductive adhesive structures is greater than 0 and less than 8 mm.

18. The wavelength conversion module as claimed in claim 1, wherein a material of the rotatable disc of the wavelength conversion wheel comprises aluminum alloy, metal oxide or silicon carbide.

19. The wavelength conversion module as claimed in claim 1, wherein a material of the deflector comprises aluminum alloy, stainless steel or metal oxide.

20. A projector, comprising an illumination module, a light valve and a projection lens, wherein
the illumination module is configured to provide an illumination light beam, and the illumination module comprises:
a light source device, configured to provide an excitation light beam; and
a wavelength conversion module, disposed on a transmission path of the excitation light beam to receive the excitation light beam, and the wavelength conversion module comprising a wavelength conversion wheel, a driving assembly, a plurality of thermal conductive adhesive structures, and a deflector, wherein
the wavelength conversion wheel comprises a rotatable disc and a wavelength conversion layer, the wavelength conversion layer is configured to receive the excitation light beam and convert the excitation light beam into a converted light beam, wherein the illumination light beam comprises at least one of the excitation light beam and the converted light beam;
the driving assembly is connected to the rotatable disc of the wavelength conversion wheel to drive the wavelength conversion wheel to rotate along an axis of the driving assembly;
the wavelength conversion layer and the thermal conductive adhesive structures are respectively located on two opposite sides of the rotatable disc, and the thermal conductive adhesive structures are arranged at intervals; and
the deflector is connected to the wavelength conversion wheel along the axis through the thermal conductive adhesive structures, wherein a plurality of heat dissipation channels are formed among the deflector, the rotatable disc and the thermal conductive adhesive structures, and an air inlet is defined by each of the heat dissipation channels and the deflector near the axis, and an air outlet is defined between each of the heat dissipation channels and a periphery of the deflector, when the wavelength conversion wheel rotates, an airflow enters each of the heat dissipation channels from the air inlet and is discharged from the air outlet, wherein an area of the air inlet is larger than an area of the air outlet;

the light valve is arranged on a transmission path of the illumination light beam to convert the illumination light beam into an image light beam; and the projection lens is arranged on a transmission path of the image light beam to project the image light beam out of the projector.

\* \* \* \* \*